UNITED STATES PATENT OFFICE.

GEORGE S. MORGAN, OF TOLEDO, OHIO, ASSIGNOR TO EDGAR G. BEHR, OF DETROIT, MICHIGAN.

RUST-PREVENTING MIXTURE FOR METALS.

1,364,134.  Specification of Letters Patent.  Patented Jan. 4, 1921.

No Drawing.  Application filed February 16, 1920. Serial No. 359,039.

*To all whom it may concern:*

Be it known that I, GEORGE S. MORGAN, a citizen of the United States, and a resident of Toledo, in the county of Lucas and State of Ohio, have made an invention appertaining to Rust-Preventing Mixture for Metals; and I do hereby declare the following to be a full, clear, and exact description of the invention, such as will enable others skilled in the art to which it appertains to make and use the same.

My invention has for its object to provide a mixture that may be readily applied to metallic bodies such as those formed from iron, steel or brass or the like, to prevent corrosion or the formation of rust. It particularly provides a means to protect machine parts from rusting when the same is exposed to moisture or when subjected to the weather.

The invention may be contained in mixtures composed of a number of similar or equivalent ingredients and the amounts thereof may be varied to produce different results.

I have selected and will describe one of the mixtures containing the invention and shall indicate some of the equivalents that may be substituted in lieu of the ingredients contained in the mixture described hereinafter.

In the preferred form of mixture containing my invention I form a mixture of one part of litharge (PbO) and two parts of animal or vegetable fatty acids, such as red oil or oleic acid. These are thoroughly mixed together and then to this is added sixty to two hundred parts of paraffin oil, the amount depending on the viscosity desired. The mixture of the fatty acid and litharge is preferably mixed cold in one-tenth ($\frac{1}{10}$) of the paraffin oil. The remaining nine-tenths ($\frac{9}{10}$) of the paraffin oil is then heated to about 180° Fahrenheit and the second mixture, namely, the mixture of the fatty acid and litharge and one-tenth paraffin oil, is slowly added to the remaining hot paraffin oil while it is being agitated. This last mixture is then heated to 230° Fahrenheit while being agitated.

In place of litharge a number of metal oxids that form water insoluble soaps with fatty acids may be used, such as oxids of manganese, copper, calcium, aluminum, etc. In place of oleic acid, fatty acids of soya bean oil, linseed oil or cotton seed oil may be used.

The surfaces of the metal to be protected from the weather and moisture are covered with the mixture as by spraying or dipping or other means.

Claim:

A rust and corrosion preventing mixture for metals consisting of one part of litharge, two parts of fatty acids and sixty to two hundred parts of paraffin oil.

In testimony whereof I have hereunto signed my name to this specification.

GEORGE S. MORGAN.